UNITED STATES PATENT OFFICE.

CARL W. SCHULTZE, OF BUFFALO, NEW YORK, ASSIGNOR OF ONE-HALF TO HUBERT K. PERRY, OF BUFFALO, NEW YORK.

PROCESS FOR PURIFYING WATER.

No. 914,887.     Specification of Letters Patent.     Patented March 9, 1909.

Application filed November 27, 1909. Serial No. 345,372.

*To all whom it may concern:*

Be it known that I, CARL W. SCHULTZE, a citizen of the United States, residing at Buffalo, in the county of Erie and State of New York, have invented a new and useful Improvement in Processes for Purifying Water of which the following is a specification.

My invention relates to processes for purifying water.

The objects of my invention are: (1) to provide a process whereby the impurities of ordinary lime-bearing water may, by chemical means,be rendered capable of removal by mechanical means; (2) to provide the chemical reagent in such form and in such established units that the process may be carried on by any person whether possessing any knowledge of chemistry or not; (3) to provide a chemical reagent which, itself, will be both harmless and the base of which will be all removed with the impurities in the straining operation; (4) to provide means for producing complete and very rapid coagulation; and (5) to provide means for filtering or straining which are simple, effective, cheap, and thoroughly sanitary.

In general it may be stated that my object is to provide a process whereby any person possessing no more equipment than one of my prepared chemical units, two receptacles for water, a funnel and a ball of absorbent cotton may thoroughly purify a quantity of water, and complete the operation in a very short period of time.

To this end my invention provides means whereby lime-bearing water may be deprived not only of ordinary suspended inorganic impurities but may also be deprived of pathogenic bacteria; and this I accomplish in the following manner: I prepare a tablet comprising the following elements: sulfate of aluminum, about four grains, kaolin, about six grains, starch, about ten grains. I then form these ingredients into a tablet or disk which is friable and which may be readily disseminated through the water as hereafter described. The tablet may be thus formed by any person skilled in the art of tablet making. I then crush this tablet, rub the same to a smooth cream with say, an ounce of water and then thoroughly mix it with one gallon of water. I then allow the mixture to stand for about five minutes, when it is ready for straining. To strain, I place in a funnel, which has been moistened on the inside, a ball of absorbent cotton about the size of an apple, pressing it down well into the funnel. Then placing the funnel into the receptacle that is to hold the clarified water, I pour the water that has been treated slowly onto the center of the cotton, until it is thoroughly wet, and then fill the funnel full and keep it filled until the entire amount has been poured in. It will now be found that the water has been deprived of its impurities, is brilliantly clear, and is potable and wholesome. According to my understanding, the following has occurred during the process. The sulfate of aluminum has undergone the usual chemical reaction with a portion of the calcium carbonate in the water, resulting in the production of a precipitate of hydrated aluminum, and the inert substances, the kaolin and the starch, have formed, throughout the liquid, nuclei or gathering-points for the flocculent material and the suspended impurities, both inorganic and organic, are enmeshed in these flocculent groups and are held there until they are filtered out by the cotton.

I do not wish to limit myself either to the precise proportions of ingredients as above stated, or to compounds particularly adapted, as is the above formula, to the purification of water for drinking, because my process is adaptable to industrial uses where purified water is a desideratum. Nor do I wish to limit myself to sulfate of aluminum as a coagulant, since equivalents may be employed, such, for example, as the double sulfates of aluminum or any mineral salt which will react with the lime to form a gelatinous precipitate. Nor do I limit myself to the use of kaolin and starch, since there are many equivalents, such for example, as talcum, phosphate of calcium, and many insoluble earths which will serve the purpose of hastening the coagulation sufficiently to insure the enmeshing of the foreign matter, particularly the germs.

I use preferably absorbent cotton as a filtering medium, as I have found it the most effective, the most sanitary, as it is never to be used twice, and the cheapest for ordinary use; but it will be understood that I may employ any desirable form of mechanical strainer without departing from the spirit of my invention. However, after long and varied experiments, I find that absorbent cotton stands practically alone and unrivaled among known materials for straining; and since it possesses the additional advantages of being used but once and discarded I prefer it both on account of its effectiveness and its cleanliness.

I am aware of the fact that adding a coagulant to water and then straining out the precipitate is known in the art, but I believe that the employment of a non-soluble ingredient to hasten the coagulation and to insure the enmeshing of the bacteria is novel with me; and I consider this one of the important features of my invention; for while ordinary impurities and many becteria may be removed by the use of a coagulant alone, the complete elimination of pathogenic germs is insured by the addition of such inert material, which enhances the completeness and the rapidity of the process. The employment of a hastening medium is, therefore, of the highest importance, not only because it prevents premature filtering—before the reagent has had time to act properly—but because it insures the complete enmeshing of the pathogenic germs so that the water is rendered perfectly wholesome.

Having thus described my process I claim:

1. Adding to water sulfate of aluminum, kaolin and starch in substantially the proportions above specified, and filtering.

2. The method of purifying lime bearing waters which consists in adding to a given unit of the water an adapted unit consisting of a soluble salt capable of forming a gelatinous precipitate, combined with an insoluble powder of such fineness that the particles will remain suspended in the water for a considerable length of time, allowing the coagulation to take place, thus enmeshing the bacteria and suspended matter, as well as the soluble organic matters, and removing the coagulation by passing the water through a fibrous material.

3. The method of purifying lime bearing waters which consists in adding to a given unit of the water a tablet composed of an adapted unit consisting of a soluble salt capable of forming a gelatinous precipitate, combined with an insoluble powder of such fineness that the particles will remain suspended in the water for a considerable length of time, allowing the coagulation to take place, thus enmeshing the bacteria and suspended matter, as well as the soluble organic matters, and removing the coagulation by passing the water through a fibrous material.

In testimony whereof I have hereunto set my hand in the presence of two witnesses.

CARL W. SCHULTZE.

Witnesses:
E. A. KELLY,
MARY A. NORTON.